Sept. 4, 1923.
H. D. KELLY
1,467,171
FLOAT VALVE FOR COFFEE URNS
Filed April 11, 1923
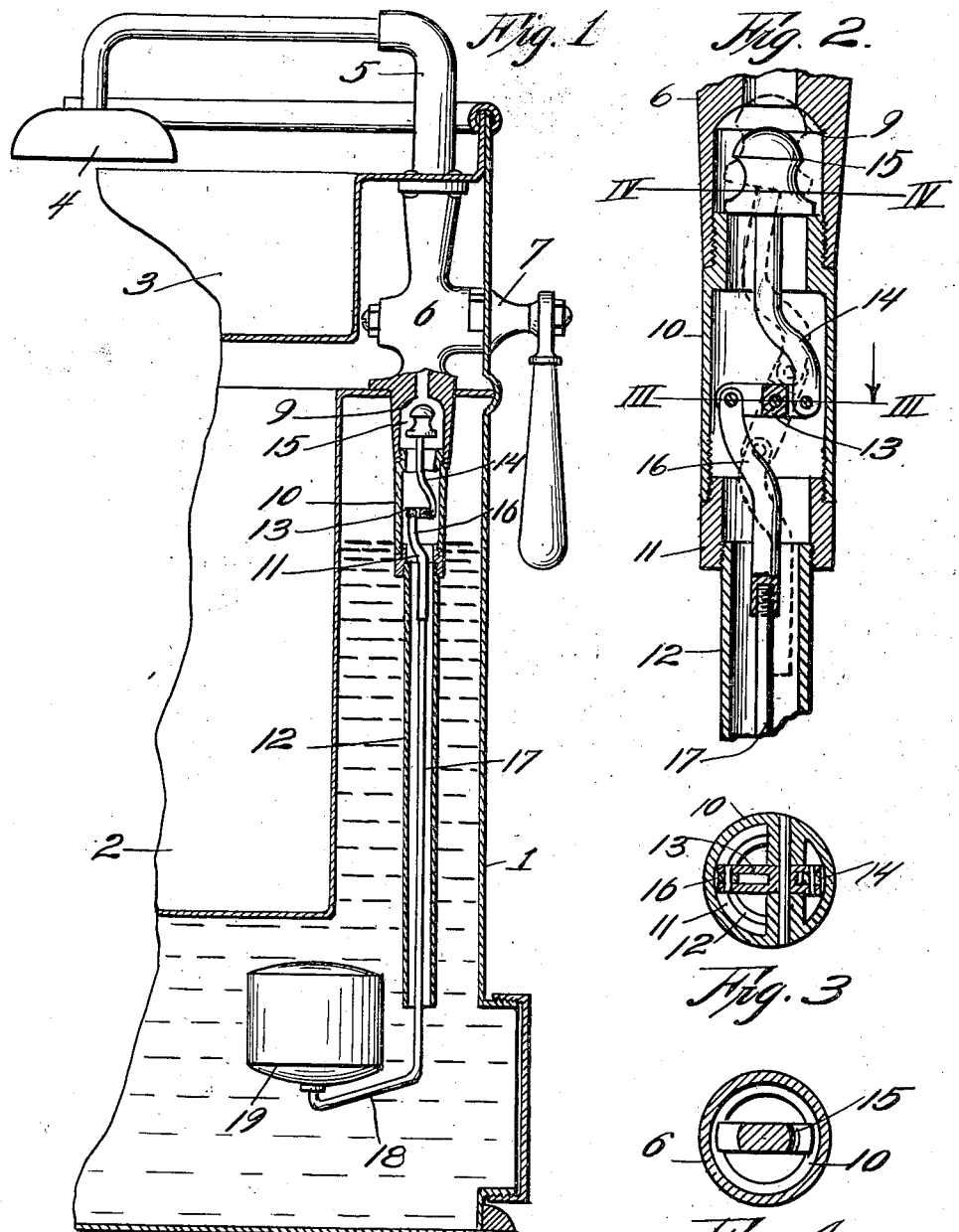

Patented Sept. 4, 1923.

1,467,171

UNITED STATES PATENT OFFICE.

HENRY D. KELLY, OF KANSAS CITY, MISSOURI.

FLOAT VALVE FOR COFFEE URNS.

Application filed April 11, 1923. Serial No. 631,384.

*To all whom it may concern:*

Be it known that I, HENRY D. KELLY, a citizen of the United States, and resident of Kansas City, county of Jackson, State of Missouri, have invented a certain new and useful Improvement in Float Valves for Coffee Urns, of which the following is a complete specification.

This invention relates to coffee urns in which the steam generated in the boiler chamber of the urn is utilized to circulate boiling water through the ground coffee into the beverage jar, such urns now on the market having a manually closed valve for controlling the action and float controlled valve held normally open and adapted to be closed when the water level falls below a predetermined point.

All urns of the type having the equipment outlined, as far as my knowledge extends, have the valve mechanism located below the water line, and when used in certain sections of the country, particularly the southwestern part thereof, soon become so incrusted that they are not dependable in operation.

My invention, therefore, is to provide a coffee urn of the general character mentioned, equipped with a dependable valve mechanism standing above the water line of the boiler compartment of the urn, for the purpose of avoiding in a large measure, the incrustation of the valve mechanism and insuring dependable operation thereof through a long period of service.

With this object in view, the invention consists in certain novel and useful features of construction and combination of parts as hereinafter described and planned; and in order that it may be fully understood reference is to be had to the accompanying drawing, in which:—

Figure 1 is a vertical section of a portion of an urn embodying the invention;

Figure 2 is an enlarged vertical section of a water circulating pipe and the valve mechanism therein;

Figure 3 is a horizontal section on the line III—III of Figure 2; and

Figure 4 is a horizontal section on the line IV—IV of Figure 2.

In the said drawing, 1 indicates a coffee urn having the customary beverage jar 2 and the receptacle 3 above the jar for holding ground coffee and receiving the spray of water from the nozzle 4 which passes through the ground coffee into the beverage jar 2. The spray 4 is connected to a pipe 5 communicating with the upper ends of a valve casing 6 containing valve 7 operable by a lever 8.

The valve casing 6 is secured upon the upper part of the partition forming the beverage jar and the boiler chamber of the urn, and is provided with a stem descending into the last named chamber. The stem is formed with a valve piece 9 and is internally threaded for engagement by the upper end of the couplings 10 which is intended to stand above the water level of the boiler chamber, as indicated by Figure 1. The lower end of the coupling 10 is screw-threaded to a collar 11 secured upon the upper end of a pipe 12 which extends downward to within a few inches of the bottom of the urn. A rock lever 13 is mounted within the coupling, and pivoted to one end of the rock lever is a bend stem 14 equipped at its upper end with a valve 15 adapted to engage the valve seat 9 at times, and close communication between the valve chamber and the valve casing 6. Pivoted to the end of said rock lever is a stem 17 extending down through the collar 11 and the pipe 12 and terminating below the latter in a laterally-extending arm 18 attached to a float 19 adapted normally to hold the valve 15 withdrawn from its seat 9 so that circulation of water up through the pipe 12, collar 11, coupling 10, valve casing 6, pipe 5, and the spray nozzle 4 shall be unimpeded.

Assuming that the water in the boiler chamber has been raised to the temperature necessary to generate steam to a suitable pressure, and it is desired to make and collect coffee beverage in the jar 2, the operator turns the handle 8 to open the valve 7. As this is accomplished, the steam in the upper part of the boiler chamber, forces boiling water from said chamber up through said pipe as above traced and through the spray upon ground coffee suspended in any suitable manner above the jar 2, the water passing through the coffee and collecting in said jar, the valve 7 being closed when the requisite quantity of coffee has been thus made.

The normal water level in the boiler chamber is as indicated in Figure 1, that is to say it is below the rock lever 13 which therefore stands normally out of the water and subjected to the same only when the water is being circulated up through the pipe as explained for the purpose of producing beverage in the jar. It will thus be understood that with the ordinary commercial urn, the water comes into contact with the valve mechanism only a few times in the course of twenty four hours and does not, for a long period of time at least, become sufficiently coated with incrustation from alkali water, to interfere with the free operation of the valve mechanism, as is true in all construction where such mechanism stands below the water level and is in constant and continuous contact with the water.

From the above description, it will be apparent that I have produced a coffee urn provided with mechanism for controlling the circulation of the water in the sense that water is free to pass up through said pipe only when in sufficient quantity in the urn, and that when the water level gets too low to properly supply the jar, the float is lowered and hence closes the passageway to the nozzle so that it is impossible for steam to blow down through said nozzle into the ground coffee, it being apparent that to attain this control, the float must stand above the lower end of pipe 12 and effect the sealing of the valve before the water level gets below the lower end of said pipe. The invention is obviously susceptible of slight modifications without departing from the principle of construction involved or sacrificing any of the advantages of the appended claims.

I claim:

1. A coffee urn, having a boiler chamber, a beverage jar and a passageway for water leading from the lower part of the boiler chamber to a point above the jar; valved mechanism in the passageway above the water level of the boiler chamber, and a float for causing the valved mechanism to leave the passageway unobstructed when the water stands in the boiler chamber at or above a predetermined level and to close said passageway when the water level falls below such predetermined level.

2. A coffee urn, having a boiler chamber, a beverage jar, and a passageway for water leading from the lower part of the boiler chamber to a point above the jar; valved mechanism in the passageway above the water level of the boiler chamber, a float for causing the valved mechanism to leave the passageway unobstructed when the water stands in the boiler chamber at or above a predetermined level and to close said passageway when the water level falls below such predetermined level, and a manually-operable valve controlling the passageway above the float-controlled valve mechanism.

3. A coffee urn, having a boiler chamber and a beverage jar, a pipe-way extending from the boiler chamber near the bottom thereof, to a point above the beverage jar, said pipe-way having a valve-seat, a valve for cooperation with said seat, and a rock-lever, in a plane above the water level of the boiler chamber, a link pivotally connecting the valve with one end of the rock-lever, a rod extending upward into the pipe-way from a point below the same and pivoted to the other end of the rock-lever, and a float on the lower end of the said rod.

4. A coffee urn, having a boiler chamber and a beverage jar, a pipe-way extending from the boiler chamber near the bottom thereof, to a point above the beverage jar, said pipe-way having a valve-seat, a valve and a rock-lever in a plane above the water level of the boiler chamber, a link pivotally connecting the valve with one end of the rock-lever, a rod extending upward into the pipe-way from a point below the same and pivoted to the other end of the rock-lever, a float attached to the lower end of the said rod, and a manually-operable valve controlling the pipe-way above the said valve mechanism.

In witness whereof I hereunto affix my signature.

HENRY D. KELLY.